(12) United States Patent
Sugimoto et al.

(10) Patent No.: US 12,166,995 B2
(45) Date of Patent: Dec. 10, 2024

(54) IMAGE ENCODING METHOD AND IMAGE DECODING METHOD

(71) Applicant: NIPPON TELEGRAPH AND TELEPHONE CORPORATION, Tokyo (JP)

(72) Inventors: Shiori Sugimoto, Musashino (JP); Seishi Takamura, Musashino (JP); Atsushi Shimizu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 397 days.

(21) Appl. No.: 17/621,550

(22) PCT Filed: Jun. 24, 2019

(86) PCT No.: PCT/JP2019/024865
§ 371 (c)(1),
(2) Date: Dec. 21, 2021

(87) PCT Pub. No.: WO2020/261314
PCT Pub. Date: Dec. 30, 2020

(65) Prior Publication Data
US 2022/0360788 A1    Nov. 10, 2022

(51) Int. Cl.
*H04N 19/00*    (2014.01)
*H04N 19/136*    (2014.01)
(Continued)

(52) U.S. Cl.
CPC .......... *H04N 19/136* (2014.11); *H04N 19/46* (2014.11); *H04N 19/50* (2014.11)

(58) Field of Classification Search
CPC ...... H04N 19/136; H04N 19/46; H04N 19/50; H04N 19/90
See application file for complete search history.

(56) References Cited

U.S. PATENT DOCUMENTS

| 2011/0129054 A1* | 6/2011 | De Villiers | ........... G06T 3/4053 378/2 |
| 2012/0251013 A1* | 10/2012 | Porikli | .................... H04N 19/97 382/250 |

(Continued)

OTHER PUBLICATIONS

Wikipedia, k-SVD (Year: 2024).*
(Continued)

*Primary Examiner* — Ping Y Hsieh
*Assistant Examiner* — Xiao Liu
(74) *Attorney, Agent, or Firm* — Harness, Dickey & Pierce, P.L.C.

(57) ABSTRACT

An image encoding method that generates and encodes a gram matrix representing an image feature when encoding an image to be encoded includes a feature map generation step of generating a plurality of feature maps from the image to be encoded; a gram matrix generation step of generating a gram matrix through calculations between/among the feature maps; a representative vector determination step of generating a representative vector and a representative coefficient value by singular value decomposition of the gram matrix; and a vector encoding step of encoding the representative coefficient value and the representative vector.

10 Claims, 4 Drawing Sheets

(51) Int. Cl.
*H04N 19/46* (2014.01)
*H04N 19/50* (2014.01)

(56) References Cited

U.S. PATENT DOCUMENTS

2019/0095787 A1* 3/2019 Kung .................... G06N 3/063
2019/0141353 A1* 5/2019 Michelini ............ H04N 19/126

OTHER PUBLICATIONS

Leon A. Gatys et al., Image Style Transfer Using Convolutional Neural Networks, IEEE Conference on Computer Vision and Pattern Recognition (CVPR), Jun. 2016, pp. 2414-2423.
Ken Nakanishi et al., Neural Multi-scale Image Compression, literature, May 16, 2018, http://arxiv.org/abs/1805.06386.

* cited by examiner

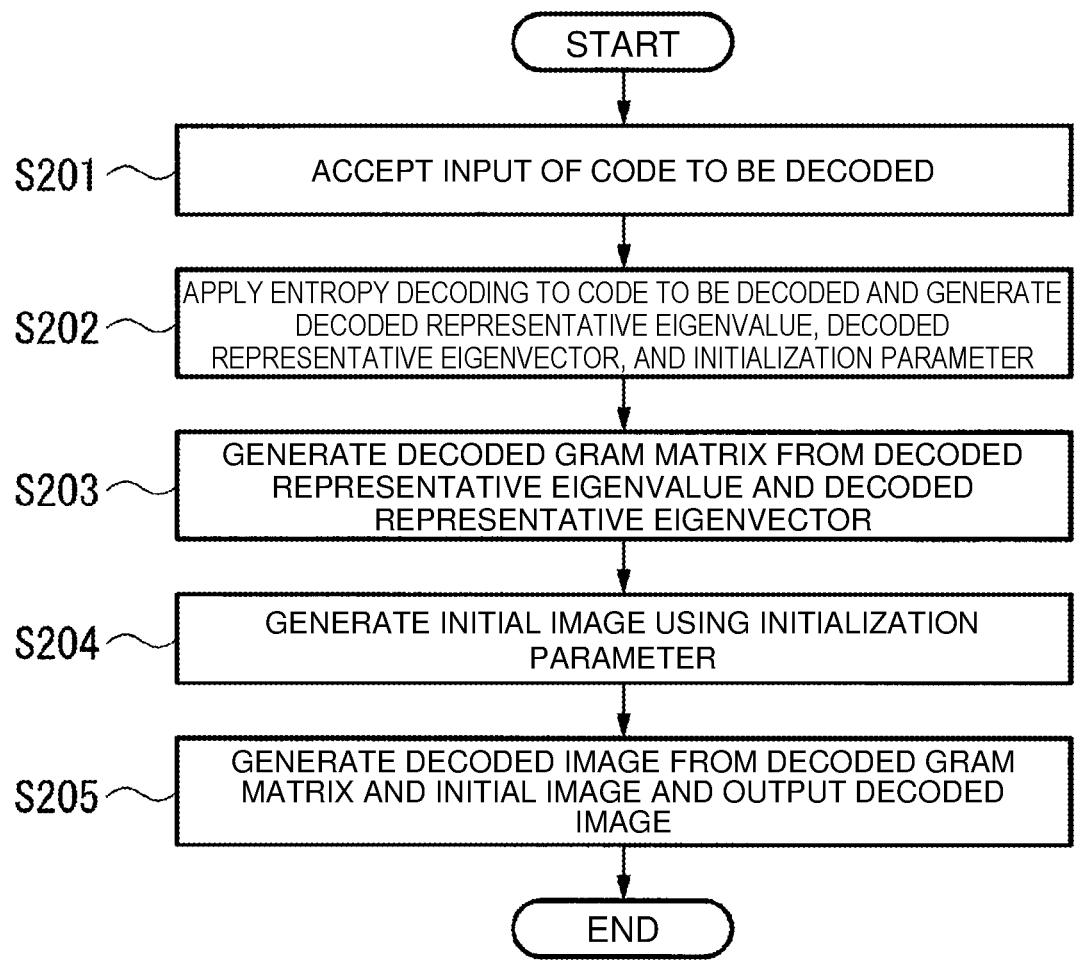

IMAGE ENCODING METHOD AND IMAGE DECODING METHOD

CROSS-REFERENCE TO RELATED APPLICATIONS

This application is a 371 U.S. National Phase of International Application No. PCT/JP2019/024865 filed on Jun. 24, 2019. The entire disclosure of the above application is incorporated herein by reference.

TECHNICAL FIELD

The present invention relates to an image encoding method and an image decoding method.

BACKGROUND ART

Typical image encoding involves orthogonally transforming an image domain into a frequency domain using DCT (Discrete Cosine Transform), DST (Discrete Sine Transform), wavelet transform, or the like and then doing entropy coding. Because a transform basis and an image are identical in dimension, the number of data items remains unchanged and the amount of information remains unreduced after the transform, but distribution of the data is deviated by the transform, improving coding efficiency of the entropy coding. Also, in so doing, if a high-frequency component whose rate of contribution to subjective image quality is said to be low is coarsely quantized, the amount of information can be reduced further. With these methods, generally the transform basis is known on the side of both encoder and decoder, and thus the transform basis itself is not encoded.

Also, in the case of video encoding, in which plural images need to be compressed efficiently in particular, to further increase a compression ratio, the images are divided into processing unit blocks and an image signal of a subject is spatially/temporally predicted on a block by block basis using special/temporal continuity of the subject. By encoding prediction information about an image signal prediction method as well as predicted residual signals subjected to the above-mentioned transformation and quantization, it is possible to more greatly improve coding efficiency than when the image signals themselves are encoded.

Image/video coding standards such as JPEG (Joint Photographic Experts Group), H.264/MPEG—4AVC (Moving Picture Experts Group—Advanced Video Coding), and H.265/HEVC (High Efficiency Video Coding) controls a generated code amount by adjusting a QP (Quantization Parameter) used in quantizing DCT and DST coefficients. On the other hand, a loss of a high-frequency component caused by an increase in the QP and block distortion occurring at block boundaries affect image quality, resulting in a loss of context information depending on the image to be handled.

Encoding methods of the type that maintains image context include dimension reduction by means of PCA (Principle Component Analysis). With this method, it is necessary to learn a principle component vector, which is a basis that represents an image, in advance using a large amount of image data. This method is capable of expressing an image using a much smaller number of coefficients than the original number of pixels when an object to be learned and an object to be encoded have similar features, and is sometimes used as an encoding method for a limited category such as a facial image. However, the method is incapable of obtaining an efficient principle component vector from sets of image data having different features, and thus incapable of creating a generalized basis. In encoding any given image, it is necessary to encode the principle component vector at the same time, but because the number of elements per basis is equal to the number of pixels in the image to be encoded, the amount of information is not reduced.

Also, in dividing an image and transforming the image on a block by block basis, a method is available that learns a basis using a block set to be encoded and treats the generated basis also as an object to be encoded. With this method, because the number of elements in the basis is smaller than the number of pixels in an image to be encoded, the number of blocks is sufficiently large for the image, making it possible to reduce the amount of information when all the blocks have similar features. However, because each block has only local features of the image, it is not generically the case that blocks obtained from the same image have features similar to one another.

On the other hand, it is known that a gram matrix generated by inner products between feature maps of an image reflects a global style feature of the image. The gram matrix and the style feature are described in detail, for example, in Non-Patent Literature 1. In relation to a set of feature maps, which are intermediate variables used when a convolutional neural network (CNN) for typical image recognition is applied to an image, Non-Patent Literature 1 describes a method for generating, at each hierarchical level, a gram matrix whose elements are inner products between feature maps belonging to the hierarchical level and generating an image similar to the original image using the gram matrices. If feature maps in a feature map set of the Lth layer are 1-dimensional column vectors and are denoted as $F^L$ when arranged lengthwise, the elements of a gram matrix $G^L$ is given by Expression (1) below.

[Math. 1]

$$G^L_{i,j} = \sum_k F^L_{i,k} F^L_{k,j} \tag{1}$$

When the number of feature maps is M, the gram matrix generated is an M-by-M matrix regardless of the numbers of pixels in the original image and the feature maps. According to Non-Patent Literature 1, a clear image having a context equivalent to that of the original image is generated by using an appropriate Gaussian noise matrix as an initial value and solving an optimization problem of bringing a gram matrix found from the Gaussian noise matrix close to the gram matrix of the original image.

It can be said that when the number of elements in a gram matrix is sufficiently smaller than the number of pixels in the original image, the context of the original image can be expressed with a smaller number of elements. However, plural gram matrices are needed in layers ranging from a superficial layer to a bottom layer in order to generate a clear image, and besides, the number of required layers increases with increases in the resolution of the image, and thus, it is difficult to satisfy the condition.

CITATION LIST

Patent Literature

Non-Patent Literature 1: L. A. Gatys, A. S. Ecker, and M. Bethge, "Image Style Transfer Using Convolutional Neural Networks," Proceedings of the IEEE Conference on Computer Vision and Pattern Recognition (CVPR), pp. 2414-2423, 2016

Non-Patent Literature 2: K. Nakanishi, S. Maeda, T. Miyato, and D. Okanohara, "Neural Multi-scale Image Compression," submitted to arXiv on May 16, 2018, found 14

SUMMARY OF THE INVENTION

Technical Problem

As described above, typical image encoding allows a code amount to be reduced by orthogonal transformation and quantization. However, depending on quantization distortion and the image to be handled, context information is lost resulting in deterioration of image quality. With PCA and other methods, although compression can be done with image context maintained, because bases cannot be generalized, in encoding any given image, it is necessary to encode the basis vectors at the same time, but because the number of elements per basis vector is equal to the number of pixels in the image to be encoded, the amount of information is not reduced.

On the other hand, although the context of the original image can be expressed well if the gram matrices of image feature maps are treated as objects to be encoded, in the number of gram matrices needed to generate a clear image, it is difficult to make the total number of elements sufficiently smaller than the number of pixels in the image.

The present invention has been made in view of the above circumstances and has an object to provide an image encoding method and an image decoding method that can reduce a code amount while maintaining image context.

Means for Solving the Problem

According to one aspect of the present invention, there is provided an image encoding method that generates and encodes a gram matrix representing an image feature when encoding an image to be encoded, the method comprising: a feature map generation step of generating a plurality of feature maps from the image to be encoded; a gram matrix generation step of generating a gram matrix through calculations between/among the feature maps; a representative vector determination step of generating a representative vector and a representative coefficient value by singular value decomposition of the gram matrix; and a vector encoding step of encoding the representative coefficient value and the representative vector.

Effects of the Invention

The present invention makes it possible to reduce a code amount while maintaining image context.

BRIEF DESCRIPTION OF DRAWINGS

FIG. 4 is a flowchart showing operation of the image decoding apparatus 200 according to the embodiment of the present invention.

DESCRIPTION OF EMBODIMENTS

An image encoding apparatus 100 and an image decoding apparatus 200 according to an embodiment of the present invention will be described below.

[Functional Configuration of Image Encoding Apparatus]

Figure 1:
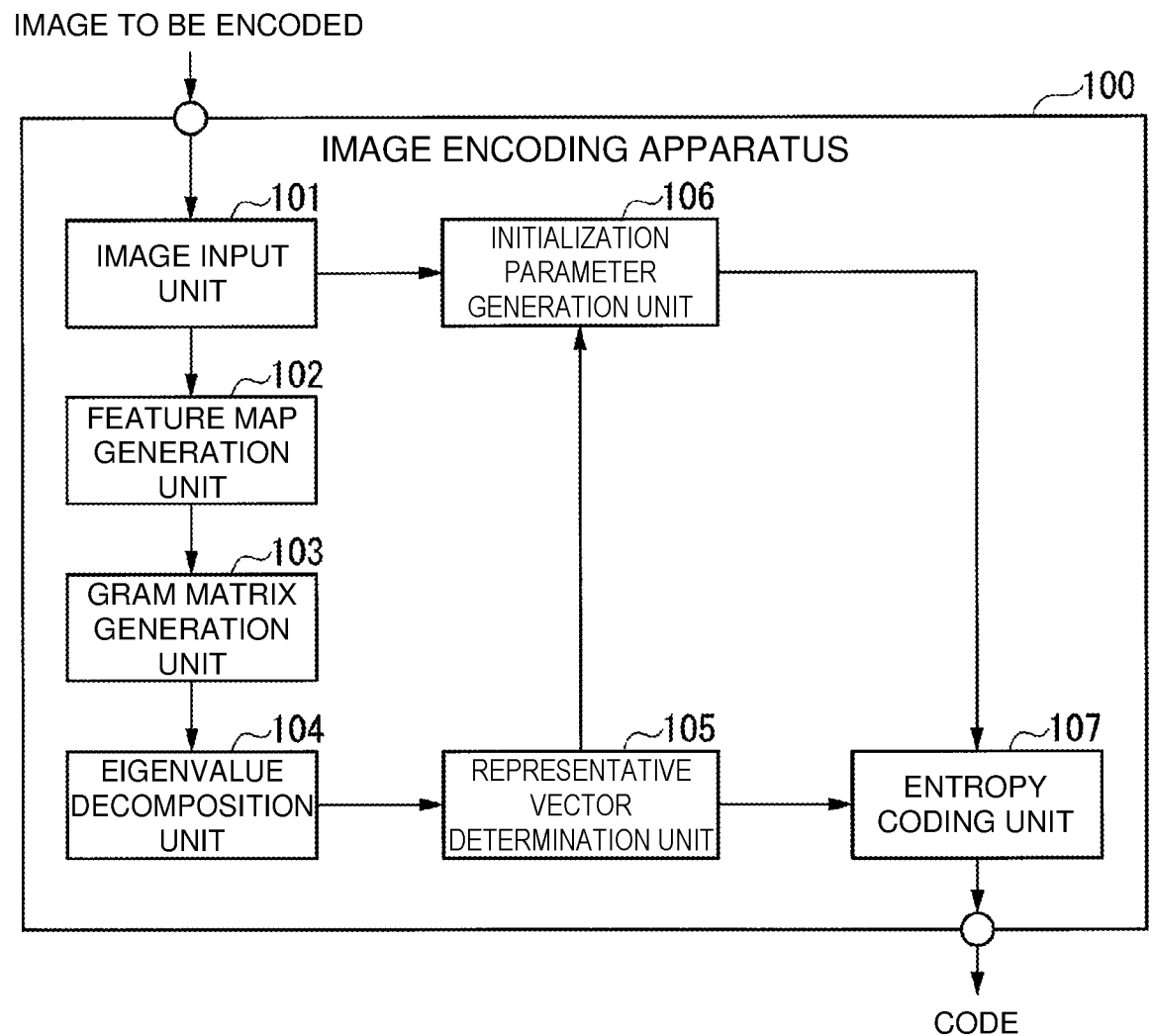
FIG. 1 is a block diagram showing a configuration of an image encoding apparatus 100 according to an embodiment of the present invention.

A functional configuration of the image encoding apparatus 100 will be described below with reference to FIG. 1. FIG. 1 is a block diagram showing a configuration of the image encoding apparatus 100 according to the embodiment of the present invention. As shown in FIG. 1, the image encoding apparatus 100 includes an image input unit 101, a feature map generation unit 102, a gram matrix generation unit 103, an eigenvalue decomposition unit 104, a representative vector determination unit 105, an initialization parameter generation unit 106, and an entropy coding unit 107.

The image input unit 101 accepts input of an image to be processed (hereinafter referred to as an "image to be encoded"), which has been outputted from an external device. The image input unit 101 outputs the image to be encoded to the feature map generation unit 102 and the initialization parameter generation unit 106.

The feature map generation unit 102 acquires the image to be encoded, which has been outputted from the image input unit 101. The feature map generation unit 102 generates a feature map from the image to be encoded. The feature map generation unit 102 outputs the generated feature map to the gram matrix generation unit 103.

Note that the feature map as referred to herein is an image obtained by filtering an image to be processed, using a filter.

The gram matrix generation unit 103 acquires the feature map outputted from the feature map generation unit 102. The gram matrix generation unit 103 generates a gram matrix from the feature map. The gram matrix generation unit 103 outputs the generated gram matrix to the eigenvalue decomposition unit 104.

Note that a gram matrix is a product A*A of a given square matrix A and an adjoint matrix A* thereof.

The eigenvalue decomposition unit 104 acquires the gram matrix outputted from the gram matrix generation unit 103. The eigenvalue decomposition unit 104 generates eigenvalues and eigenvectors from the gram matrix. The eigenvalue decomposition unit 104 outputs the generated eigenvalues and eigenvectors to the representative vector determination unit 105.

The representative vector determination unit 105 acquires the eigenvalues and eigenvectors outputted from the eigenvalue decomposition unit 104. The representative vector determination unit 105 generates a representative coefficient value and a representative vector from the eigenvalues and eigenvectors. The representative vector determination unit 105 outputs the generated representative coefficient value and representative vector to the initialization parameter generation unit 106 and the entropy coding unit 107.

The initialization parameter generation unit 106 acquires the image to be encoded, which has been outputted from the image input unit 101. Also, the initialization parameter generation unit 106 acquires the representative coefficient value and representative vector outputted from the representative vector determination unit 105. The initialization parameter generation unit 106 generates an initialization parameter from the representative coefficient value, the representative vector, and the image to be encoded. The initialization parameter generation unit 106 outputs the generated initialization parameter to the entropy coding unit 107.

The entropy coding unit 107 acquires the representative coefficient value and representative vector outputted from the representative vector determination unit 105. Also, the entropy coding unit 107 acquires the initialization parameter outputted from the initialization parameter generation unit 106. The entropy coding unit 107 applies entropy coding to the representative coefficient value, the representative vector, and the initialization parameter. The entropy coding unit 107 outputs the generated code to an external device.

[Operation of Image Encoding Apparatus]

Figure 2:
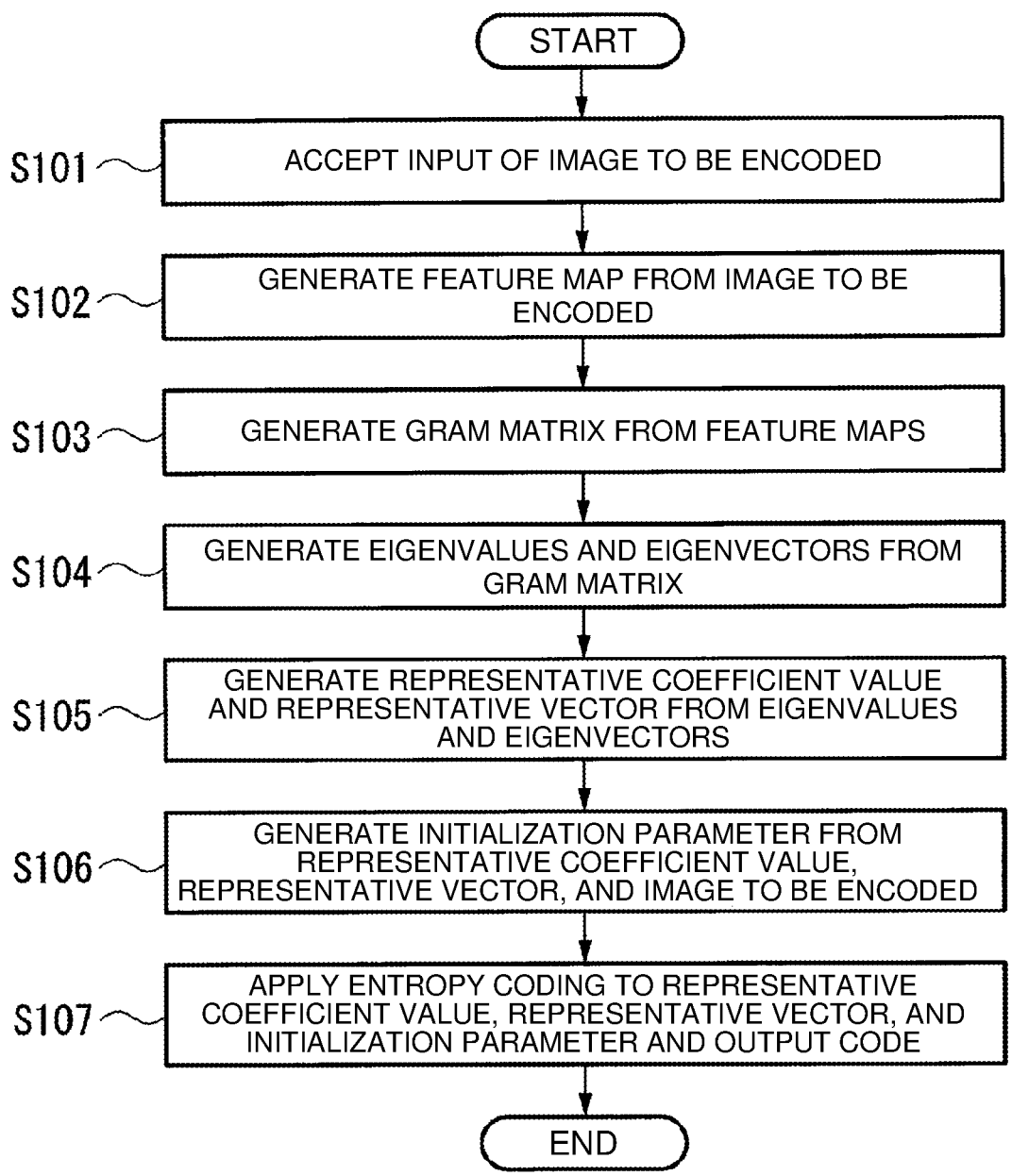
FIG. 2 is a flowchart showing operation of the image encoding apparatus 100 according to the embodiment of the present invention.

Operation of the image encoding apparatus 100 will be described below with reference to FIG. 2. FIG. 2 is a flowchart showing operation of the image encoding apparatus 100 according to the embodiment of the present invention.

First, the image input unit 101 accepts input of an image to be encoded (step S101). Next, the feature map generation unit 102 generates a feature map from the image to be encoded (step S101).

Note that the feature map may be generated by any method. For example, in generating the feature map, any linear or non-linear filter such as an edge extraction filter, a smoothing filter, a sharpening filter, or a statistical filter can be used. Also, any number of filters may be used in any combination. For example, a feature map may be generated by applying a linear filter to an image, and further applying non-linear functions such as an absolute value, a step function, a sigmoid function, softsign, and a ramp function to the resulting image. Also, resolution of the feature map does not have to be equal to that of the input image and may be higher or lower than the resolution of the input image. Also, any number of feature maps may be generated.

For ease of explanation, it is assumed below that an image I to be encoded is an n-by-n second-rank tensor. Also, it is assumed in the description that the feature map generation unit 102 convolutes m filters $f_i$ on the image I to be encoded and applies a non-linear function g to the results thereof to generate feature maps. The ith feature map $f_i$ is given by Expression (2) below.

[Math. 2]

$$\phi(I)_i = g(f_i * I) \qquad (2)$$

Also, the feature map generation unit 102 may further apply any desired filters hierarchically to the generated feature maps and use all or part of the results at each hierarchical level as a feature map. It is known that, of the feature maps of respective hierarchical levels obtained by hierarchical convolution, generally feature maps in upper layers reflect features related to details while feature maps in lower layers reflect features related to context of the image.

Also, the feature map generation unit 102 may generate feature maps by generating a first-layer feature map on the image to be encoded, using any desired method, generating a second-layer feature map on the downsampled image to be encoded, using the same method, and repeating the above procedures any desired times. This method can better capture a global feature of the image (see, for example, Non-Patent Literature 2).

Next, the gram matrix generation unit 103 generates a gram matrix from the feature maps (step S103). If the feature maps in the feature map set (feature map group) of the Lth layer are 1-dimensional column vectors, and are denoted as $F^L$ when arranged lengthwise, the elements of a gram matrix $G^L$ is given by Expression (3) below.

[Math. 3]

$$G^L_{i,j} = \sum_k F^L_{i,k} F^L_{k,j} \qquad (3)$$

Next, the eigenvalue decomposition unit 104 generates eigenvalues and eigenvectors from the gram matrix (step S104). The gram matrix is a real symmetric matrix as also can be seen from a derivation process of the gram matrix. Therefore, the gram matrix can be diagonalized without exception. In so doing, there can be a combination of an eigenvalue and an eigenvector not used subsequently by the representative vector determination unit 105, and the eigenvalue and the eigenvector do not need to be generated in that case.

As can be seen from Expressions (4) to (6) below, a gram matrix G can be decomposed into a matrix D in which eigenvalues are arranged diagonally and a matrix V in which eigenvectors are arranged side by side as column vectors.

[Math. 4]

$$G^L = V^L D^L (V^L)^t \qquad (4)$$

[Math. 5]

$$D^L = \begin{bmatrix} \lambda_0 & 0 & \cdots & 0 \\ 0 & \lambda_1 & \cdots & 0 \\ \vdots & \vdots & \ddots & \vdots \\ 0 & 0 & \cdots & \lambda_{n-1} \end{bmatrix} \qquad (5)$$

[Math. 6]

$$V^L = [v_0 \ v_1 \ \cdots \ v_{n-1}] \qquad (6)$$

Next, the representative vector determination unit 105 generates a representative coefficient value and a representative vector from the eigenvalues and the eigenvectors (step S105). Note that any method may be used in generating the representative coefficient value and the representative vector. The simplest generation method is, for example, a method in which the representative vector determination unit 105 selects small numbers of eigenvalues and eigenvectors in descending order beginning with the largest eigenvalue and designates the selected eigenvalues and eigenvectors as representative coefficient values and representative vectors. This enables better low-rank approximation of the original gram matrix.

In so doing, the numbers of representative coefficient values and representative vectors to be selected may be either predetermined values or values determined based on distribution of representative coefficient values. Alternatively, the representative vector determination unit 105 may determine optimum numbers that will maximize decoding quality, while actually decoding an image. When k combinations are selected, the gram matrix is approximated as shown in Expressions (7) to (9) below using $\hat{D}^L$ that has representative coefficient values as diagonal components as well as using representative vectors $\hat{V}^L$.

[Math. 7]

$$\hat{G}^L = \hat{V}^L \hat{D}^L (\hat{V}^L)^t \qquad (7)$$

-continued

[Math. 8]

$$\hat{D}^L = \begin{bmatrix} \lambda_0 & 0 & \cdots & 0 \\ 0 & \lambda_1 & \cdots & 0 \\ \vdots & \vdots & \ddots & \vdots \\ 0 & 0 & \cdots & \lambda_{k-1} \end{bmatrix} \quad (8)$$

[Math. 9]

$$\hat{V}^L = [v_0 \ v_1 \ \cdots \ v_{k-1}] \quad (9)$$

Also, if gram matrices in different layers have the same number of elements, common representative vectors may be used for all the gram matrices. For example, when gram matrices are generated by the method described in Non-Patent Literature 2, because feature values themselves are similar in nature even if layers are different, the gram matrices can be expressed efficiently by the same basic vector.

The common representative vector may be derived by any method. For example, one of eigenvectors may be designated as the common representative vector, and a coefficient value may be newly derived to suit another eigenvector and designated as a representative coefficient value corresponding to the representative vector. For example, when a representative vector $V^{\wedge l-1}$ of the (1-1)th layer is used as a representative vector $V^{\wedge l}$ of the lth layer, the representative vector determination unit 105 selects a matrix $D^{\wedge l}$ having a representative coefficient value of the lth layer as a diagonal component such that the relationship of Expression (10) below will be satisfied.

[Math. 10]

$$\hat{G}^l = V^{l-1}\hat{D}^l(V^{l-1})^t \quad (10)$$

Alternatively, one of eigenvectors may be designated as a common representative vector, and a difference of another eigenvector from the common vector may be designated as a representative vector.

[Math. 11]

$$\hat{V}^l = V^l - V^{l-1} \quad (11)$$

In this case, on the image decoding apparatus 200 described later, when the gram matrix in the lth layer is restored, the representative vector of the lth layer is added to the representative vector of the (1-1)th layer before use.

Also, a basis vector common to the two eigenvectors may be found separately or differential values from the common vector may be encoded for the respective eigenvectors. Regarding the representative coefficient values, a common value may be used or differential values from the common value may be used as the representative coefficient values. When the target image has fractality, because feature values are similar in nature even if layers are different, the target image can be expressed efficiently by similar representative coefficient values.

Also, even if gram matrices in different layers differ in the number of elements, a subset of one of eigenvectors may be used for another representative vector. Besides, by mapping one of eigenvectors, another representative vector can be generated.

Alternatively, if a section is one frame of a video, a representative vector used in another decoded frame may be used or a differential thereof may be a representative vector (differential vector). In that case, a common value may be used as a representative coefficient value or the differential may be used as the representative coefficient value. Alternatively, if another decoded frame has been encoded by a general image encoding scheme an eigenvector may be derived therefrom anew and designated as a representative vector (predicted representative vector) of the section or a differential may be designated as a representative vector (differential vector).

In this way, the representative coefficient value and the representative vector may be generated by any method as long as the method can be identified on the side of the image decoding apparatus 200 described later. Also, information (predictive parameters) needed in order to identify the generation method may be encoded separately as additional information.

Note that processes of the eigenvalue decomposition unit 104 and the representative vector determination unit 105 may be performed simultaneously. For example, the processes may be as follows: each time the eigenvalue decomposition unit 104 generates a set of an eigenvalue and an eigenvector, the representative vector determination unit 105 finds approximations and then the eigenvalue decomposition unit 104 further generates a set of an eigenvalue and an eigenvector again as required.

Alternatively, if gram matrices in different layers are equal in the number of elements, the eigenvalue decomposition unit 104 may derive a representative vector that will efficiently express plural gram matrices.

The initialization parameter generation unit 106 generates an initialization parameter from the representative coefficient value, the representative vector, and the image to be encoded (step S106). The initialization parameter may be of any form as long as the information contained in the parameter is the one needed for the after-mentioned image decoding apparatus 200 to generate an initial image in restoring an image and may be determined in whatever way. For example, if the initial image is designed to be formed of noise, the initialization parameter may be a noise generation parameter.

Alternatively, any initial image itself or an image that allows an initial image to be generated may be used as an initialization parameter. For example, if the image to be encoded is used as an initial image after being downsampled to any desired size and being upsampled again, the image resulting from the downsampling may be used as an initialization parameter. In that case, an upsampling parameter may be included in the initialization parameter. Alternatively, a color space of the image to be encoded may be used as an initialization parameter after being quantized and used as an initial image after being dequantized.

Alternatively, an image obtained by compressing the image to be encoded by a desired image or video encoding method may be used as an initialization parameter and an image obtained by decoding may be used as an initial image. Besides, any image may be used.

Alternatively, if a section is one frame of a video, assuming that another decoded frame is used as an initial image, information that allows the frame to be identified may be used as an initialization parameter. In so doing, by further including information indicating interframe change in the initialization parameter, an initial image may be generated based on this information. For example, if a vector indicating interframe movement information is used as the initialization parameter, a decoded frame deformed accordingly may be used as an initial image.

Alternatively, if a desired low-dimensional feature value is found for the section and an image similar to the feature value is allowed to be selected freely on the side of the image decoding apparatus 200 described later, the feature value may be used as an initialization parameter. In that case, if a representative coefficient value and a representative vector are used as a feature value, an initialization parameter does not always have to be generated.

Note that if an initialization parameter can be identified on the image decoding apparatus 200 described later, or if there is no need to control decoding quality on the image decoding apparatus 200 described later, the initialization parameter does not need to be generated.

The entropy coding unit 107 applies entropy coding to the representative coefficient value, the representative vector, and the initialization parameter and outputs code (step S107). Note that if no initialization parameter is generated as described above, the entropy coding unit 107 may encode only the representative coefficient value and the representative vector without encoding any initialization parameter.

Also, the entropy coding unit 107 may encode information that allows the representative coefficient value, the representative vector, and the initialization parameter to be identified, instead of directly encoding the representative coefficient value, the representative vector, and the initialization parameter. The information is, for example, an index or the like into a lookup table.

Also, the entropy coding unit 107 may encode some parameters separately as additional information, where the parameters are: a parameter used to identify an optimization problem and a parameter used to define constraints, when the image is restored on the image decoding apparatus 200 described later.

As described above, an image encoding method performed by the image encoding apparatus 100 according to the embodiment of the present invention generates and encodes a gram matrix representing an image feature when encoding an image to be encoded. The encoding method includes: a feature map generation step of generating a plurality of feature maps from the image to be encoded; a gram matrix generation step of generating a gram matrix through calculations between/among the feature maps; a representative vector determination step of generating a representative vector and a representative coefficient value by singular value decomposition of the gram matrix; and a vector encoding step of encoding the representative coefficient value and the representative vector.

The image encoding apparatus 100 according to the embodiment of the present invention finds gram matrices representing feature maps of any given image to be encoded and treats a few representative values and representative vectors as objects to be encoded, where the representative values and the representative vectors approximate the gram matrices. The number of elements of the gram matrix in each layer is $N^2$ if the number of feature maps is N, but by performing eigenvalue decomposition, the image encoding apparatus 100 can express the gram matrix in each layer using a fewer number of eigenvectors or efficiently express gram matrices in plural layers using a still fewer number of eigenvectors.

[Functional configuration of image decoding apparatus]

Figure 3:
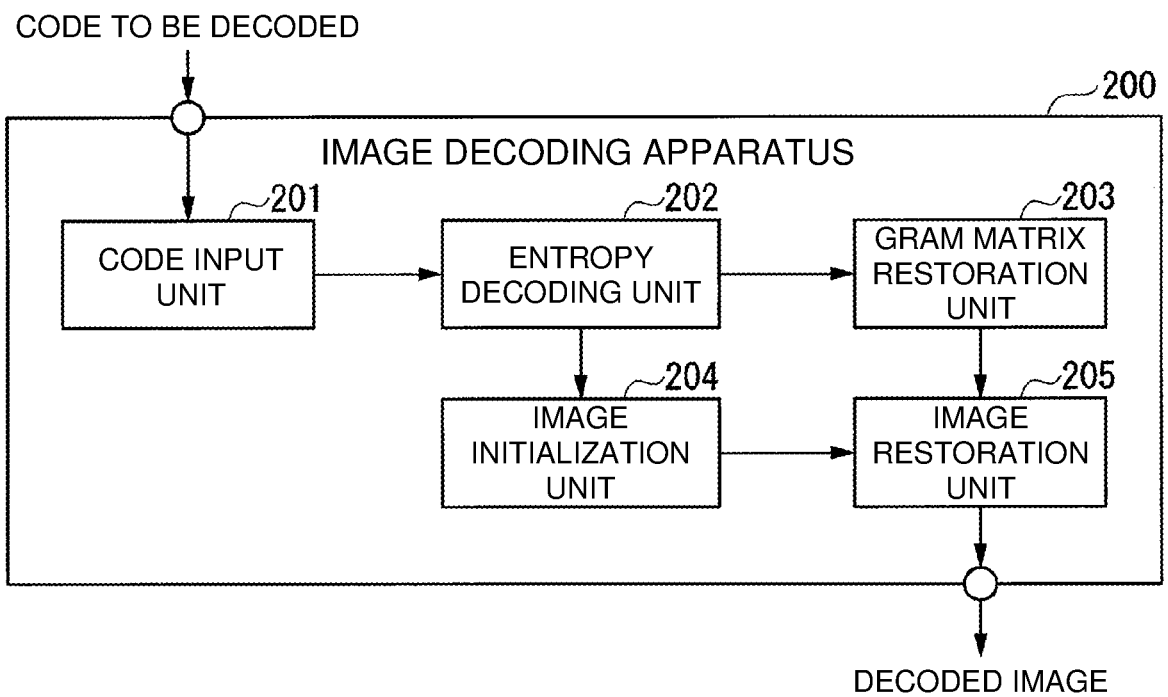
FIG. 3 is a block diagram showing a configuration of an image decoding apparatus 200 according to the embodiment of the present invention.

A functional configuration of the image decoding apparatus 200 will be described below with reference to FIG. 3. FIG. 3 is a block diagram showing a configuration of the image decoding apparatus 200 according to the embodiment of the present invention. As shown in FIG. 3, the image decoding apparatus 200 includes a code input unit 201, an entropy decoding unit 202, a gram matrix restoration unit 203, an image initialization unit 204, and an image restoration unit 205.

The code input unit 201 accepts input of a code to be processed (hereinafter referred to as a "code to be decoded"), which has been outputted from an external device. The code input unit 201 outputs the code to be decoded to the entropy decoding unit 202.

The entropy decoding unit 202 acquires the code to be decoded, which has been outputted from the code input unit 201. The entropy decoding unit 202 applies entropy decoding to the code to be decoded, and generates a decoded representative eigenvalue, a decoded representative eigenvector, and an initialization parameter. The entropy decoding unit 202 outputs the decoded representative eigenvalue and decoded representative eigenvector, which have been generated, to the gram matrix restoration unit 203. Also, the entropy decoding unit 202 outputs the generated initialization parameter to the image initialization unit 204.

The gram matrix restoration unit 203 acquires the decoded representative eigenvalue and decoded representative eigenvector outputted from the entropy decoding unit 202. The gram matrix restoration unit 203 generates a decoded gram matrix from the decoded representative eigenvalue and the decoded representative eigenvector. The gram matrix restoration unit 203 outputs the decoded gram matrix, which has been generated, to the image restoration unit 205.

The image initialization unit 204 acquires the initialization parameter outputted from the entropy decoding unit 202. The image initialization unit 204 generates an initial image using the initialization parameter. The image initialization unit 204 outputs the generated initial image to the image restoration unit 205.

The image restoration unit 205 acquires the decoded gram matrix outputted from the gram matrix restoration unit 203. Also, the image restoration unit 205 acquires the initial image outputted from the image initialization unit 204. The image restoration unit 205 generates a decoded image from the decoded gram matrix and the initial image. The image restoration unit 205 outputs the decoded image, which has been generated, to an external device.

[Operation of Image Decoding Apparatus]

Operation of the image decoding apparatus 200 will be described below with reference to FIG. 4. FIG. 4 is a flowchart showing operation of the image decoding apparatus 200 according to the embodiment of the present invention.

First, the code input unit 201 accepts input of the code to be decoded (step S201). Next, the entropy decoding unit 202 applies entropy decoding to the code to be decoded, and generates a decoded representative eigenvalue, a decoded representative eigenvector, and an initialization parameter (step S202).

The gram matrix restoration unit 203 generates a decoded gram matrix from the decoded representative eigenvalue and the decoded representative eigenvector (step S203). The method for generating the decoded gram matrix depends on the method used to generate the representative coefficient value and the representative vector from the eigenvalues and the eigenvectors on the image encoding apparatus 100. For example, if the representative coefficient value of a layer to be generated is given as a differential value from the representative coefficient value of another layer, the gram matrix restoration unit 203 adds the two representative coefficient values, thereby calculating the sum of the two representative coefficient values as a decoded value of a corresponding representative vector, and thereby generates the decoded gram matrix of the layer to be generated. Besides, the gram matrix restoration unit 203 may use any generation method including the above-mentioned method for generating the decoded gram matrix. Also, if information identifying a generation method has been encoded as additional information, the gram matrix restoration unit 203 may decode and use this information.

The image initialization unit 204 generates an initial image using the initialization parameter (step S204). The method for generating the initial image depends on the type of initialization parameter. For example, if the initialization parameter is a downsampled image of the image to be encoded, the image initialization unit 204 generates the initial image by upsampling the downsampled image. Besides, the image initialization unit 204 may use any generation method including the above-mentioned method for generating the initial image. Also, if the initialization parameter has not been encoded, the image initialization unit 204 may perform initialization by identifying the initialization method in another way. For example, if suitable initialization methods are defined in advance by classifying the methods according to statistical information about decoded representative eigenvalues and decoded representative eigenvectors, the image initialization unit 204 can identify the initialization method based on the definitions. Besides, the image initialization unit 204 may perform initialization completely freely.

The image restoration unit 205 generates a decoded image from the decoded gram matrix and the initial image and outputs the decoded image (step S205). In generating the decoded image, the image restoration unit 205 tries to bring the gram matrix in the decoded image close to the decoded gram matrix.

For example, the simplest method generates a decoded image by solving the optimization problem given by Expression (12) below, where I denotes the decoded image, $\phi_l$ denotes an operation of generating a gram matrix in the lth layer from the image, and $G^{\wedge l}$ denotes a decoded gram matrix in the lth layer.

[Math. 12]

$$I = \mathrm{argmin} \Sigma_l w_l |\hat{G}^l - \phi(I)|^2_2 \tag{12}$$

where $w_l$ is the weight of each layer. The weight $w_l$ may be a predetermined value. Alternatively, $w_l$ may have been generated and encoded as additional information by the image encoding apparatus 100 and decoded on the image decoding apparatus 200. Besides, a smoothness term such as Total Variation for the image may be further added.

Any method may be used as the method for optimization. For example, a method that involves repeating sequential updates by means of an error back-propagation method may be used.

Also, by training a neural network that generates images from gram matrices, a learning model obtained as a result may be used.

Note that an eigenvalue and an eigenvector are similar to the original matrix. Therefore, the gram matrix restoration unit 203 may directly input a decoded representative eigenvalue and a decoded representative eigenvector directly to the image restoration unit 205 without generating a decoded gram matrix and the image restoration unit 205 may restore an image while performing eigenvalue decomposition of gram matrices in the image being restored.

As described above, an image decoding method performed by the image decoding apparatus 200 according to the embodiment of the present invention decodes a gram matrix representing an image feature, from code data and thereby generates a decoded image. The image decoding method includes: a vector decoding step of decoding a representative coefficient value and a representative vector from the code data, a gram matrix decoding step of decoding a gram matrix from the representative coefficient value and the representative vector; and an image restoration step of restoring the decoded image based on the gram matrix.

Consequently, using the gram matrices restored from the representative values and the representative vectors, the image decoding apparatus 200 according to the embodiment of the present invention generates an image having a context similar to the original image and designates the image as a decoded image, thereby making it possible to reduce a code amount while maintaining image context.

As described above, the image encoding apparatus 100 according to the above embodiment finds gram matrices representing feature maps of any given image to be encoded and encodes a few representative values and representative vectors that approximate the gram matrices. Also, the image decoding apparatus 200 according to the above embodiment generates an image having a context similar to the original image and designates the image as a decoded image using the gram matrices restored from the representative values and the representative vectors. With these configurations, the image encoding apparatus 100 and image decoding apparatus 200 according to the above embodiment can reduce a code amount while maintaining image context.

The image encoding apparatus 100 and image decoding apparatus 200 according to the above embodiment may be implemented by a computer. In that case, programs that implement these functions may be recorded on a computer-readable recording medium and read and executed by a computer system to implement the devices. It is assumed that the "computer system" as referred to herein includes an OS and hardware such as peripheral devices. Also, the "computer-readable recording medium" refers to a portable medium such as a flexible disk, a magneto-optical disk, a ROM, or a CD-ROM, or a storage device, built into the computer system, such as a hard disk. Furthermore, the "computer-readable recording medium" may include a recording medium that dynamically holds a program for a short time when a program is transmitted through a network such as the Internet or a communications line such as a telephone line and a recording medium such as a volatile memory that holds the program in the computer system for a set amount of time when the computer system is acting as a server or a client during the transmission. The program may be designed to implement only part of the functions described above or implement the functions described above in conjunction with a program prestored in the computer system. Alternatively, the above functions may be implemented using hardware such as an FPGA (Field Programmable Gate Array) or a PLD (programmable logic device).

Whereas an embodiment of the present invention has been described above with reference to the drawings, the above embodiment is only exemplary of the present invention, and it is apparent that the present invention is not limited to the embodiment described above. Thus, components may be added, omitted, replaced, or otherwise changed without departing from the technical idea and scope of the present invention.

REFERENCE SIGNS LIST

100 Image encoding apparatus
101 Image input unit
102 Feature map generation unit
103 Gram matrix generation unit
104 Eigenvalue decomposition unit
105 Representative vector determination unit
106 Initialization parameter generation unit
107 Entropy coding unit 200 Image decoding apparatus
201 Code input unit
202 Entropy decoding unit
203 Gram matrix restoration unit
204 Image initialization unit
205 Image restoration unit

The invention claimed is:

1. An image encoding method that generates and encodes a gram matrix representing an image feature when encoding an image to be encoded, the method comprising:
- a feature map generation step of generating a plurality of feature maps from the image to be encoded and generates a plurality of feature map groups, each of which is a set of the plurality of feature maps;
- a gram matrix generation step of generating the gram matrix through calculations among the plurality of feature maps and generating gram matrices for the respective feature map groups;
- a representative vector determination step of generating a representative vector and a representative coefficient value by singular value decomposition of the gram matrix and generating a set of a representative vector and a representative coefficient value, the set corresponding to each of the gram matrices; and
- a vector encoding step of encoding the representative coefficient value, and the representative vector.

2. The image encoding method according to claim 1, wherein the representative vector determination step determines a vector common to all the gram matrices as a representative vector and determines a representative coefficient value in each of the gram matrices, the representative coefficient value corresponding to the representative vector.

3. The image encoding method according to claim 1, wherein the vector encoding step predicts the representative vector in a set through a calculation of another representative vector, thereby generating a predicted representative vector, and encodes a predictive parameter and a differential vector, where the predictive parameter identifies the calculation and the differential vector is a differential value between the predicted representative vector and the representative vector.

4. The image encoding method according to claim 1, further comprising an eigen value decomposition step of generating eigenvalues and eigenvectors from the gram matrix, wherein the representative vector determination step generates the representative coefficient value and the representative vector from the eigenvalues and the eigenvectors.

5. The image encoding method according to claim 1, wherein the plurality of features maps from the image to be encoded are generated by an extraction filter, a smoothing filter, a sharpening filter, or a statistical filter.

6. An image encoding method that generates and encodes a gram matrix representing an image feature when encoding an image to be encoded, the method comprising:
- a feature map generation step of generating a plurality of feature maps from the image to be encoded;
- a gram matrix generation step of generating the gram matrix through calculations among the plurality of feature maps;
- a representative vector determination step of generating a representative vector and a representative coefficient value by singular value decomposition of the gram matrix;
- an initialization parameter generation step of generating an initialization parameter for use in image restoration, from the image to be encoded; and
- a vector encoding step of encoding the initialization parameter, representative coefficient value, and the representative vector.

7. The image encoding method according to claim 6, wherein the initialization parameter is a quantized color space of the image to be encoded.

8. The image encoding method according to claim 6, wherein the initialization parameter is an image downsampled from image to be encoded.

9. An image decoding method that decodes a gram matrix representing an image feature, from code data and thereby generates a decoded image, the method comprising:
- a vector decoding step of decoding a representative coefficient value, and a representative vector from the code data, decoding a plurality of sets of the representative vector and the representative coefficient value, decoding a predictive parameter and a differential vector during encoding of the representative vector in a set, generating a predicted representative vector by predicting another representative vector through a calculation based on the predictive parameter, and designates a sum of the differential vector and the predicted representative vector as a decoded value of a representative vector for the set;
- a gram matrix decoding step of decoding the gram matrix from the representative coefficient value and the representative vector, generating gram matrices for the respective sets of a representative vector and a representative coefficient value, and restoring the decoded image based on all the gram matrices; and
- an image restoration step of restoring the decoded image based on the gram matrix.

10. An image decoding method that decodes a gram matrix representing an image feature, from code data and thereby generates a decoded image, the method comprising:
- a vector decoding step of decoding a representative coefficient value, and a representative vector from the code data, and an initialization parameter from the code data;
- an initial image generation step generates an initial image from the initialization parameter;
- a gram matrix decoding step of decoding the gram matrix from the representative coefficient value and the representative vector; and
- an image restoration step of restoring the decoded image based on the gram matrix; and
- the image restoration step generates a decoded image based on the initial image and the gram matrix.

* * * * *